US011030757B1

(12) United States Patent
Liu

(10) Patent No.: US 11,030,757 B1
(45) Date of Patent: Jun. 8, 2021

(54) QUEUE ANALYZING METHOD AND IMAGE MONITORING APPARATUS

(71) Applicant: VIVOTEK INC., New Taipei (TW)

(72) Inventor: Cheng-Chieh Liu, New Taipei (TW)

(73) Assignee: VIVOTEK INC., New Taipei (TW)

( * ) Notice: Subject to any disclaimer, the term of this patent is extended or adjusted under 35 U.S.C. 154(b) by 68 days.

(21) Appl. No.: 16/708,449

(22) Filed: Dec. 10, 2019

(51) Int. Cl.
*G06T 7/30* (2017.01)
*G07C 11/00* (2006.01)
*G06T 7/136* (2017.01)

(52) U.S. Cl.
CPC .............. *G06T 7/30* (2017.01); *G06T 7/136* (2017.01); *G07C 11/00* (2013.01); *G07C 2011/04* (2013.01)

(58) Field of Classification Search
CPC ............ G06T 7/30; G06T 7/136; G07C 11/00
USPC ....................................................... 382/103
See application file for complete search history.

(56) References Cited

U.S. PATENT DOCUMENTS

| 2010/0124358 | A1* | 5/2010 | Huang ..................... G06T 7/254 382/103 |
| 2012/0207350 | A1* | 8/2012 | Loos .................. G06K 9/00778 382/103 |
| 2016/0180173 | A1* | 6/2016 | Westmacott ....... G06K 9/00771 382/103 |

FOREIGN PATENT DOCUMENTS

TW 201946029 A 12/2019

* cited by examiner

*Primary Examiner* — Ayodeji O Ayotunde
(74) *Attorney, Agent, or Firm* — Winston Hsu

(57) ABSTRACT

A queue analyzing method is applied to an image monitoring apparatus for determining whether a rear object belongs to a queue of a front object. The queue analyzing method includes computing an angle difference and an interval between the rear object and the front object, transforming an original interval threshold into an amended interval threshold via the angle difference, comparing the interval with the amended interval threshold, and determining the rear object and the front object belong to the same queue when the interval is smaller than the amended interval threshold.

18 Claims, 4 Drawing Sheets

QUEUE ANALYZING METHOD AND IMAGE MONITORING APPARATUS

BACKGROUND OF THE INVENTION

1. Field of the Invention

The present invention relates to a queue analyzing method and an image monitoring apparatus, and more particularly, to a queue analyzing method of determining whether a rear object belongs to a queue of a front object and a related image monitoring apparatus.

2. Description of the Prior Art

A conventional queue analyzing method sets an interval threshold and a time threshold with fixed values. When the interval between a rear customer and a front customer is smaller than the interval threshold and a staying period of the rear customer exceeds the time threshold, the rear customer is considered as belonging to a queue of the front customer. If the front customer moves forward, but the rear customer stays and is distant from the front customer, the conventional queue analyzing method may determine the rear customer does not belong to the queue of the front customer because the interval is greater than the interval threshold. In addition, if the front customer stays and the rear customer moves backward for making way for the passerby, the interval between the rear customer and the front customer is increased, and the conventional queue analyzing method may determine the rear customer does not belong to the queue of the front customer because the interval is greater than the interval threshold. Thus, design of a queue analyzing method of adjusting the interval threshold via some specific factors to prevent a queue from being broken is an important issue in the related monitoring industry.

SUMMARY OF THE INVENTION

The present invention provides a queue analyzing method of determining whether a rear object belongs to a queue of a front object and a related image monitoring apparatus for solving above drawbacks.

According to the claimed invention, a queue analyzing method of determining whether a rear object belongs to a queue of a front object is disclosed. The queue analyzing method includes computing an angle difference and an interval between the rear object and the front object, transforming an original interval threshold into an amended interval threshold via the angle difference, comparing the interval with the amended interval threshold, and determining the rear object and the front object belong to the same queue when the interval is smaller than the amended interval threshold.

According to the claimed invention, an image monitoring apparatus includes an image receiver and an operational processor. The image receiver is adapted to acquire an image. The operational processor is electrically connected with the image receiver for determining whether a rear object belongs to a queue of a front object. The operational processor is adapted to compute an angle difference and an interval between the rear object and the front object, transform an original interval threshold into an amended interval threshold via the angle difference, compare the interval with the amended interval threshold, and determine the rear object and the front object belong to the same queue when the interval is smaller than the amended interval threshold.

The queue analyzing method and the image monitoring apparatus of the present invention takes account of the object's vector, the staying period and the gathered amount behind for adaptively adjusting the interval threshold, to ensure completeness of the queue in some specific situations and prevent the queue from being broken by misjudgment. One situation is the interval between the rear object and the front object exceeds the original interval threshold, and the original interval threshold can be enlarged to transform into the amended interval threshold for increasing the probability of counting the rear object into the queue of the front object when the rear object positively faces the front object (which means the angle difference is small), or when the staying period of the rear object is raised (which means the rear object queues up consciously), or when the gathered amount behind the rear object is numerous (which means the gathered objects keep order in the queue). Another situation is that the rear object is slightly distant from the front object and more close to a neighbored queue; because the rear object positively faces the front object (which has the smaller angle difference) but back on to the neighbored queue (which means the larger angle difference relative to an object in the neighbored queue), the present invention can enlarge the interval threshold of the queue and reduce the interval threshold of the neighbored queue, so as to accurately determine that the rear object belongs to the queue of the front object instead of the neighbored queue.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
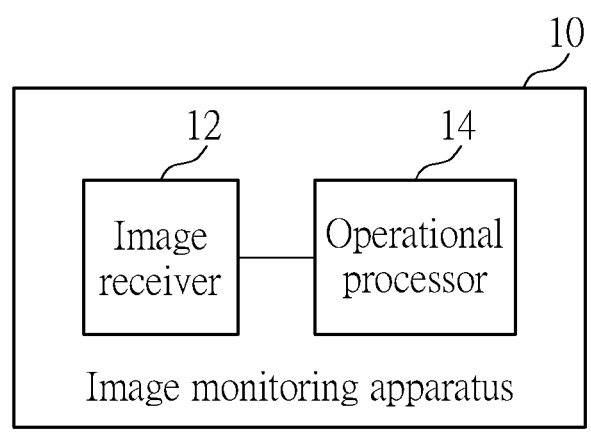
FIG. 1 is a functional block diagram of an image monitoring apparatus according to an embodiment of the present invention.
Figure 2:
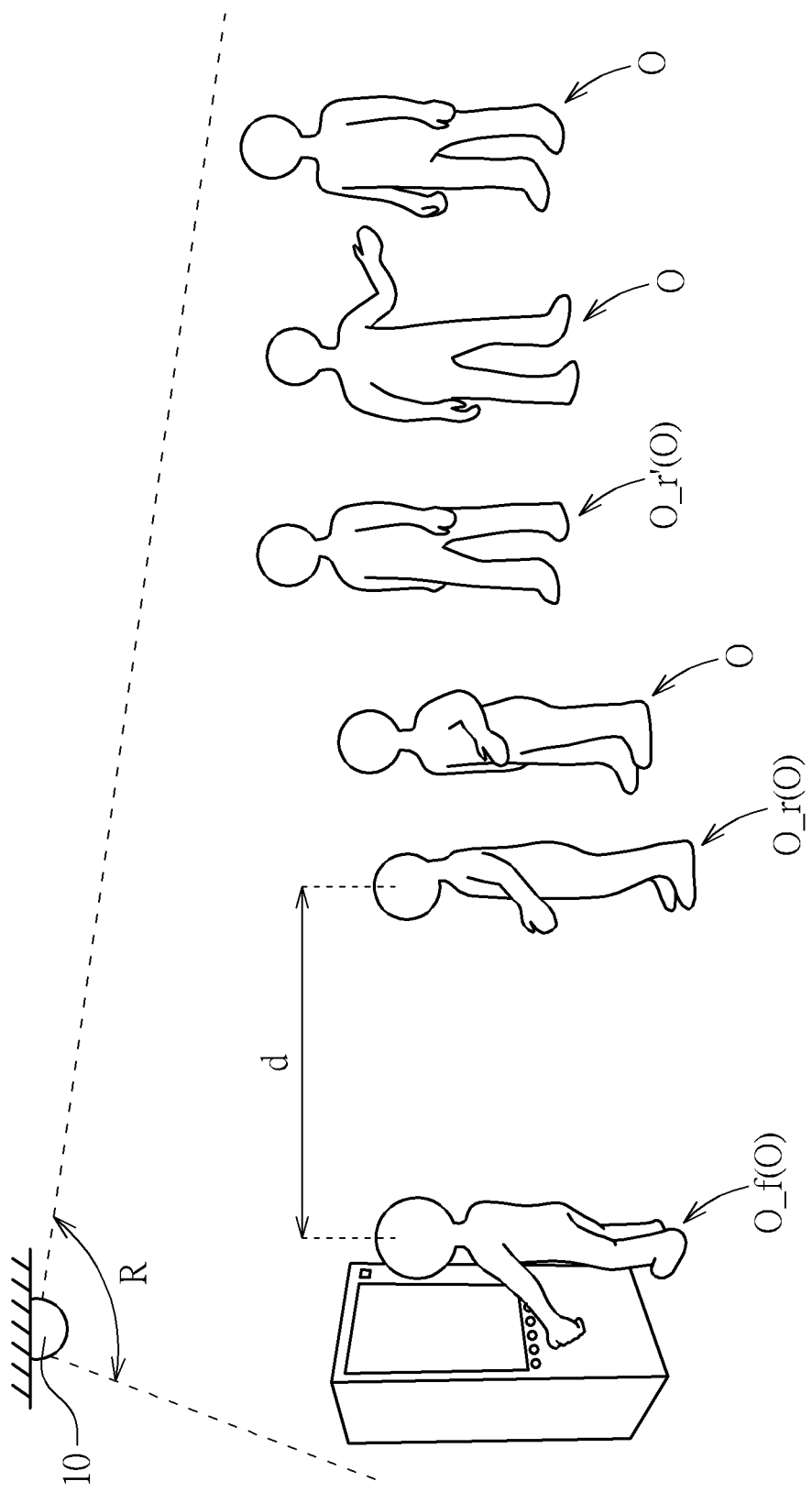
FIG. 2 is an assembly diagram of the image monitoring apparatus according to the embodiment of the present invention.
Figure 3:
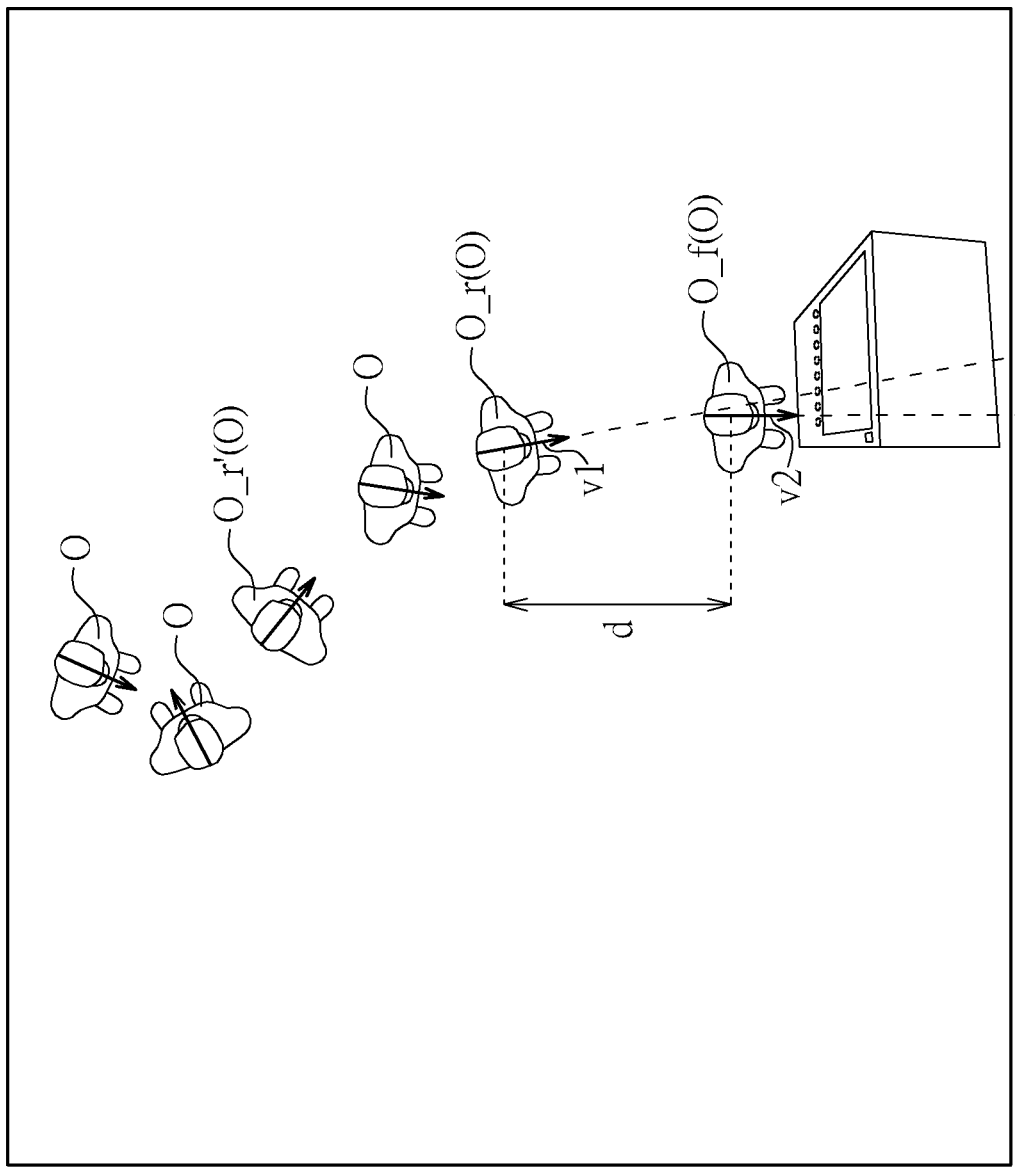
FIG. 3 is a diagram of an image acquired by the image monitoring apparatus according to the embodiment of the present invention.

Please refer to FIG. 1 to FIG. 3. FIG. 1 is a functional block diagram of an image monitoring apparatus 10 according to an embodiment of the present invention. FIG. 2 is an assembly diagram of the image monitoring apparatus 10 according to the embodiment of the present invention. FIG. 3 is a diagram of an image I acquired by the image monitoring apparatus 10 according to the embodiment of the present invention. The image monitoring apparatus 10 can include an image receiver 12 and an operational processor 14. The image monitoring apparatus 10 may be disposed around a counter or a vending machine in the market, and used to monitor an object O inside a monitoring region R, such as customer queuing information. The image receiver 12 can acquire the image I about the monitoring region R of the image monitoring apparatus 10. The operational processor 14 can be electrically connected with the image receiver 12 in a wire manner or in a wireless manner. The operational processor 14 can analyze intervals between the objects O inside the image I for determining the customer queuing information.

Figure 4:
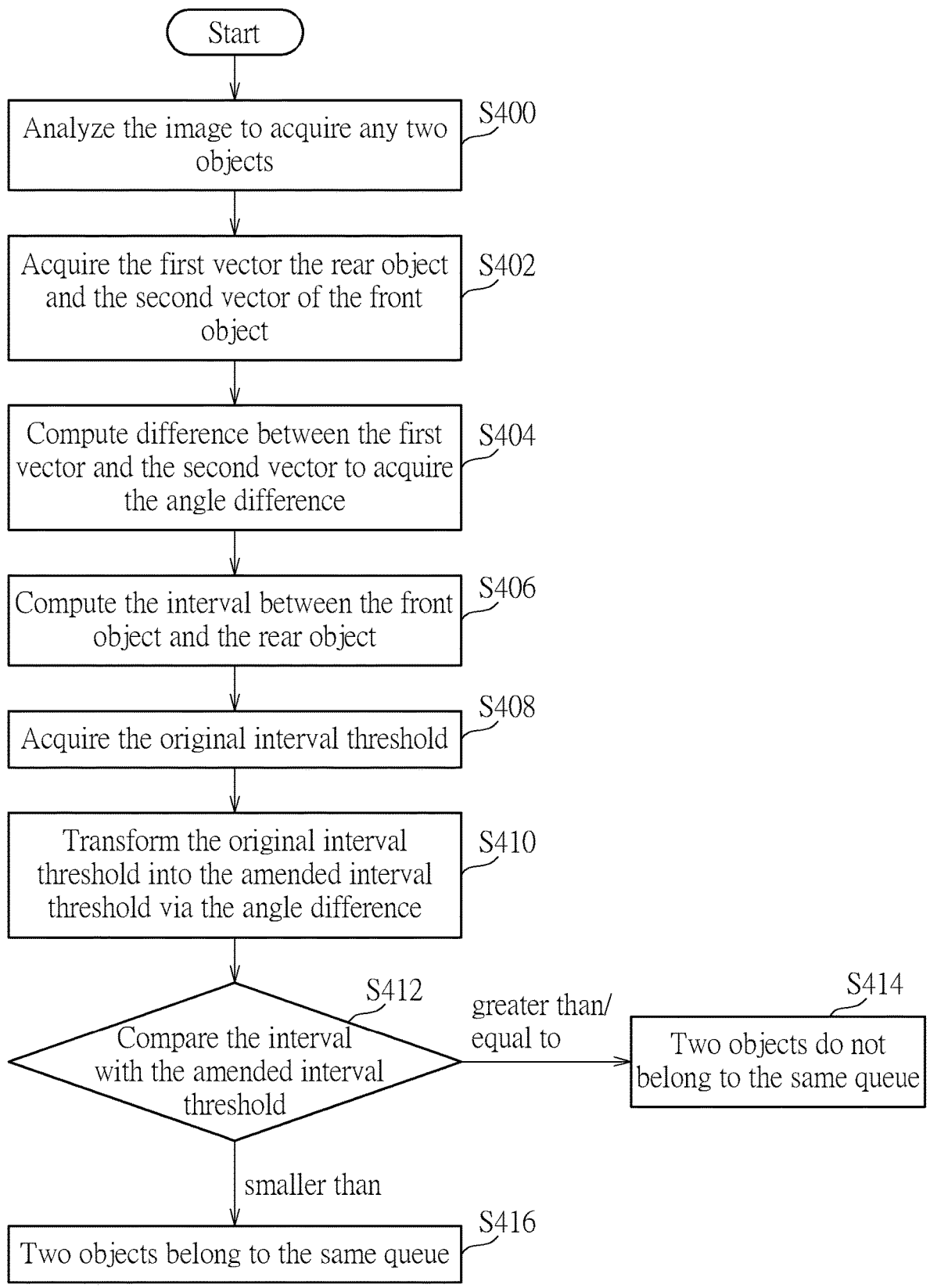
FIG. 4 is a flow chart of a queue analyzing method according to the embodiment of the present invention.

Please refer to FIG. 1 to FIG. 4. FIG. 4 is a flow chart of a queue analyzing method according to the embodiment of the present invention. The queue analyzing method illustrated in FIG. 4 can be suitable for the image monitoring apparatus 10 shown in FIG. 1 and FIG. 2. The queue analyzing method can firstably define a beginning region, such as the vending machine in the image I, and analyze the plurality of objects O in sequence from the beginning region to determine whether the objects O are in the same queue. For a start, step S400 can be executed to analyze the image I for acquiring any two objects, such as a front object O_f and a rear object O_r. Then, steps S402, S404 and S406 can be executed to acquire a first vector v1 of the rear object O_r and a second vector v2 of the front object O_f, compute difference between the first vector v1 and the second vector v2 to acquire an angle difference θ, and compute an interval d between the front object O_f and the rear object O_r.

In step S400, the two objects can be adjacent objects; for example, there is no object located between the front object O_f and the rear object O_r shown in FIG. 2. Further, the two objects can be non-adjacent objects, such as the front object O_f and the rear object O_r' shown in FIG. 2. As long as an object amount between the front object O_f and the rear object O_r' is lower than a predefined value, the queue analyzing method of the present invention can be applied for determining whether the two objects belong to the same queue. The predefined value can be a positive numeral pre-stored in a memory (not shown in the figures) of the image monitoring apparatus 10. The predefined value can be varied according to an installation place of the image monitoring apparatus 10, and a detailed description is omitted herein for simplicity.

The image monitoring apparatus 10 of the present invention can be disposed on the ceiling, and the image I can contain top-down view patterns of the plurality of objects O. The queue analyzing method can optionally use feature analyzing estimation technology or neural networks training technology to decide a direction of each object O, so as to acquire the vector of each object O; however, the present invention is not limited to the above-mentioned embodiments, and any image processing technology capable of analyzing the vector of the object belongs to a design scope of the queue analyzing method in the present invention.

Then, the queue analyzing method can execute steps S408 and S410 to acquire an original interval threshold Th1 from the memory (not shown in the figures) of the image monitoring apparatus 10, and transform the original interval threshold Th1 into an amended interval threshold Th2 via the angle difference θ. Finally, step S412 can be executed to compare the interval d with the amended interval threshold Th2. If the interval d is greater than or equal to the amended interval threshold Th2, the rear object O_r is distant from the front object O_f, and step S414 can be executed to determine the objects O_r and O_f do not belong to the same queue. If the interval d is smaller than the amended interval threshold Th2, step S416 can be executed to determine the rear object O_r and the front object O_f belong to the same queue.

In an actual situation, the customer does not always face the counter or the vending machine. The customer may make a turn to talk with a friend, or may be unconsciously distant from the fore person because of operating the mobile phone, or may be purposely distant from the fore person for making way for the passerby. In order to prevent the queue from being broken due to a far distance between the queuing customers, the queue analyzing method of the present invention can analyze the facing direction of the customer to adaptively adjust the original interval threshold Th1. As long as the angle difference between the front object and the rear object is within a tolerant range, the original interval threshold Th1 can be transformed and enlarged into the amended interval threshold Th2, so as to increase the probability of the front object and the rear object belonging to the same queue.

In step S410, the queue analyzing method can utilize an angle function to adjust the interval threshold, such as the formula 1. The memory of the image monitoring apparatus 10 may pre-store one or several angle functions and related angle weightings k. If the memory contains one angle function and one angle weighting k, the queue analyzing method can substitute the angle difference θ and the angle weighting k into the angle function for acquiring an angle amending value, and then the original interval threshold Th1 can be transformed into the amended interval threshold Th2 via the angle amending value. If the memory contains some angle functions and some angle weightings k, the queue analyzing method can choose one angle function and one angle weighting in accordance with the installation place of the image monitoring apparatus 10, and utilize a substitution result of the angle difference θ to compute the amended interval threshold Th2 accordingly.

For example, the angle function can be a cosine function, or any function with a transforming property the same as or similar to the cosine function. The angle amending value can be a product or a computation value of the angle weighting k and a substitution value of the cosine function. The foresaid transforming property may represent that the substitution value of the cosine function can be varied from a maximal value to a minimal value according to variation of the angle difference θ (θ=0° ~180). Thus, if the rear object O_r positively faces the front object O_f, the angle difference θ is small, and the original interval threshold Th1 can be enlarged to generate the amended interval threshold Th2 by transformation. If the rear object O_r is back on to the front object O_f, the angle difference θ is large, and the original interval threshold Th1 can be reduced to generate the amended interval threshold Th2 by transformation. In other possible embodiments, the present invention may enlarge the original interval threshold Th1 to generate the amended interval threshold Th2 when the rear object O_r positively faces the front object O_f positively, but not change the original interval threshold Th1 when the rear object O_r is back on to the front object O_f; therefore, transformation about the original interval threshold Th1 and the amended interval threshold Th2 depends on actual demand.

$$Th2 = Th1 \times (1 + k \times \cos \theta) \qquad \text{Formula 1}$$

The image monitoring apparatus 10 of the present invention can further adjust the interval threshold via other factors. In one embodiment, the queue analyzing method can determine whether the rear object O_r stays at the same place. If the rear object O_r keeps moving, the queue analyzing method can determine that the rear object O_r does not belong to the queue of the front object O_f, and the angle difference θ between the rear object O_r and the front object O_f is only used to adjust the interval threshold. If the rear object O_r stays at the same place, a staying period t can be recorded and acquired; when the staying period t exceeds a waiting threshold, the staying period t can be substituted into a predefined time function, such as the formula 2, and a time weighting m can be applied for acquiring a time amending value. Final, the queue analyzing method can utilize the angle amending value and the time amending value to transform the original interval threshold Th1 into the amended interval threshold Th2. For example, the time function can be a hyperbolic tangent function, and the time amending value can be a product of the time weighting m and a substitution value of the hyperbolic tangent function.

The hyperbolic tangent function has a property of the staying period t being shorter in response to the small time amending value, and the staying period t being longer in response to the large time amending value; thus, the original interval threshold Th1 can be enlarged to generate the amended interval threshold Th2 when the rear object O_r stays in the long period. The present invention is not limited to the above-mentioned embodiments, and any function with a transforming property the same as or similar to the tangent function can be applied for the queue analyzing method in the present invention.

As shown in FIG. 2, if the staying period t of the rear object O_r is longer and the rear object O_r positively faces the front object O_f, the probability of the rear object O_r and the front object O_f belonging to the same queue is increased, so that the present invention provides an amending concept of the time function and the time weighting m for amendment. The original interval threshold Th1 can be enlarged or increased to generate the large amended interval threshold Th2 in response to the longer staying period t. Even though the rear object O_r is slightly distant from the front object O_f, the rear object O_r still can be determined as belonging to the queue of the front object O_f because of the large amended interval threshold Th2.

$$Th2=Th1\times(1+k\times\cos\theta)\times(1+m\times\tanh(t)))$$ Formula 2

In another possible embodiment, the queue analyzing method can analyze and acquire an object queuing amount g located on a side of the rear object O_r opposite to the front object O_f, as the four objects O behind the rear object O_r shown in FIG. 2. The queue analyzing method can acquire an amount weighting n and an amount function, such as the formula 3, and substitute the object queuing amount g into the amount function, and compute an amount amending value via the amount weighting n. Then, the original interval threshold Th1 can be transformed into the amended interval threshold Th2 though the angle amending value, the time amending value and the amount amending value. For example, the amount function can be the hyperbolic tangent function, and the amount amending value can be the product of the amount weighting n and a substitution value of the hyperbolic tangent function. Property of the hyperbolic tangent function is similar to the above-mentioned embodiment, and application of the amount function is not limited to the foresaid example, which depends on design demand.

Please refer to FIG. 2. If the rear object O_r positively faces the front object O_f and several objects stand behind the rear object O_r, the rear object O_r and the behind objects have highly probability of belonging to the queue of the front object O_f. Thus, the present invention provides an amending concept of the amount function and the amount weighting n. The original interval threshold Th1 can be enlarged or increased to generate the longer amended interval threshold Th2 in response to the more object queuing amount g. Even if the rear object O_r is slightly distant from the front object O_f, the rear object O_r still can be determined as belonging to the queue of the front object O_f because of the longer amended interval threshold Th2.

It should be mentioned that the queue analyzing method of the present invention provides a first embodiment of only considering the angle difference θ, a second embodiment of merely considering the angle difference θ and the staying period t, and a third embodiment of fully considering the angle difference θ, the staying period t and the object queuing amount g, but the actual application is not limited to the above-mentioned embodiments. The queue analyzing method may provide one embodiment of considering the angle difference θ and the object queuing amount g, or another embodiment of considering the angle difference θ, the staying period t, the object queuing amount g and other possible factors.

$$Th2=Th1\times(1+k\times\cos\theta)\times(1+m\times\tanh(t)+n\times\tanh(g)))$$ Formula 3

The queue analyzing method and the image monitoring apparatus of the present invention takes account of the object's vector, the staying period and the gathered amount behind for adaptively adjusting the interval threshold, to ensure completeness of the queue in some specific situations and prevent the queue from being broken by misjudgment. One situation is the interval between the rear object and the front object exceeds the original interval threshold, and the original interval threshold can be enlarged to transform into the amended interval threshold for increasing the probability of counting the rear object into the queue of the front object when the rear object positively faces the front object (which means the angle difference is small), or when the staying period of the rear object is raised (which means the rear object queues up consciously), or when the gathered amount behind the rear object is numerous (which means the gathered objects keep order in the queue). Another situation is that the rear object is slightly distant from the front object and more close to a neighbored queue; because the rear object positively faces the front object (which has the smaller angle difference) but back on to the neighbored queue (which means the larger angle difference relative to an object in the neighbored queue), the present invention can enlarge the interval threshold of the queue and reduce the interval threshold of the neighbored queue, so as to accurately determine that the rear object belongs to the queue of the front object instead of the neighbored queue.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A queue analyzing method of determining whether a rear object belongs to a queue of a front object, the queue analyzing method comprising:
   computing an angle difference and an interval between the rear object and the front object;
   transforming an original interval threshold into an amended interval threshold via the angle difference;
   comparing the interval with the amended interval threshold; and
   determining the rear object and the front object belong to the same queue when the interval is smaller than the amended interval threshold.

2. The queue analyzing method of claim 1, wherein computing the angle difference between the rear object and the front object comprises:
   acquiring a first vector of the rear object and a second vector of the front object; and
   computing difference between the first vector and the second vector to generate the angle difference.

3. The queue analyzing method of claim 1, wherein the queue analyzing method enlarges the original interval threshold to generate the amended interval threshold when the angle difference is within a tolerant range, so as to increase probability of the rear object belonging to the queue of the front object.

4. The queue analyzing method of claim 1, wherein transforming the original interval threshold into the amended interval threshold via the angle difference comprises:
acquiring an angle function and substituting the angle difference into the angle function;
acquiring an angle weighting; and
utilizing an angle amending value generated by the angle function and the angle weighting to compute the amended interval threshold.

5. The queue analyzing method of claim 4, wherein the angle function is a cosine function, or any function with a transforming property the same as or similar to the cosine function.

6. The queue analyzing method of claim 4, further comprising:
determining whether the rear object stays;
acquiring a staying period of the rear object; and
utilizing the angle difference and the staying period to transform the original interval threshold into the amended interval threshold.

7. The queue analyzing method of claim 6, wherein utilizing the angle difference and the staying period to transform the original interval threshold into the amended interval threshold comprises:
acquiring a time function and substituting the staying period into the time function;
acquiring a time weighting;
utilizing the time function and the time weighting to acquire a time amending value; and
utilizing the angle difference and the time amending value to compute the amended interval threshold.

8. The queue analyzing method of claim 4, further comprising:
acquiring an object queuing amount located on a side of the rear object opposite to the front object; and
utilizing the angle difference and the object queuing amount to transform the original interval threshold into the amended interval threshold.

9. The queue analyzing method of claim 8, wherein utilizing the angle difference and the object queuing amount to transform the original interval threshold into the amended interval threshold comprises:
acquiring an amount function and substituting the object queuing amount into the amount function;
acquiring an amount weighting;
utilizing the amount function and the amount weighting to acquire an amount amending value; and
utilizing the angle difference and the amount amending value to compute the amended interval threshold.

10. An image monitoring apparatus, comprising:
an image receiver adapted to acquire an image; and
an operational processor electrically connected with the image receiver for determining whether a rear object belongs to a queue of a front object, the operational processor being adapted to compute an angle difference and an interval between the rear object and the front object, transform an original interval threshold into an amended interval threshold via the angle difference, compare the interval with the amended interval threshold, and determine the rear object and the front object belong to the same queue when the interval is smaller than the amended interval threshold.

11. The image monitoring apparatus of claim 10, wherein the operational processor is further adapted to acquire a first vector of the rear object and a second vector of the front object, and compute difference between the first vector and the second vector to generate the angle difference.

12. The image monitoring apparatus of claim 10, wherein the operational processor enlarges the original interval threshold to generate the amended interval threshold when the angle difference is within a tolerant range, so as to increase probability of the rear object belonging to the queue of the front object.

13. The image monitoring apparatus of claim 10, wherein the operational processor is further adapted to acquire an angle function and substituting the angle difference into the angle function, acquire an angle weighting, and utilize an angle amending value generated by the angle function and the angle weighting to compute the amended interval threshold.

14. The image monitoring apparatus of claim 13, wherein the angle function is a cosine function, or any function with a transforming property the same as or similar to the cosine function.

15. The image monitoring apparatus of claim 13, wherein the operational processor is further adapted to determine whether the rear object stays, acquire a staying period of the rear object, and utilize the angle difference and the staying period to transform the original interval threshold into the amended interval threshold.

16. The image monitoring apparatus of claim 15, wherein the operational processor is further adapted to acquire a time function and substituting the staying period into the time function, acquire a time weighting, utilize the time function and the time weighting to acquire a time amending value, and utilize the angle difference and the time amending value to compute the amended interval threshold.

17. The image monitoring apparatus of claim 13, wherein the operational processor is further adapted to acquire an object queuing amount located on a side of the rear object opposite to the front object, and utilize the angle difference and the object queuing amount to transform the original interval threshold into the amended interval threshold.

18. The image monitoring apparatus of claim 17, wherein the operational processor is further adapted to acquire an amount function and substituting the object queuing amount into the amount function, acquire an amount weighting, utilize the amount function and the amount weighting to acquire an amount amending value, and utilize the angle difference and the amount amending value to compute the amended interval threshold.

* * * * *